3,044,954
SILICEOUS CRACKING CATALYST WITH A
DISCONTINUOUS SURFACE GLAZE
Alfred E. Hirschler, Springfield, Pa., assignor to Sun Oil
Company, Philadelphia, Pa., a corporation of New
Jersey
No Drawing. Filed Apr. 11, 1958, Ser. No. 727,775
9 Claims. (Cl. 208—114)

This invention relates to a method of preparing cracking catalysts which are highly resistant to attrition and to the catalysts so-produced.

The use of siliceous catalysts for cracking hydrocarbons is well known. Such catalysts may be used in cracking processes such as fixed bed, moving bed or fluidized bed operations. In moving bed or fluidized bed operations, during the cracking step, the catalyst generally moves in a downwardly direction under the influence of gravity while contacting hydrocarbons which may be in liquid or gas phase, or in both liquid and gas phase. After passing through the cracking zone, the catalyst is regenerated as by burning off carbon deposits and is then elevated, or lifted, so that it may again descend through the cracking zone. In some instances deactivated catalyst particles are elevated to a regeneration zone located above the cracking zones. These lift operations may be mechanically performed, but gas lift operations wherein catalyst particles are blown upwardly by means of a high velocity gas stream have many advantages. For example, flue gas flowing through a vertical conduit at high velocity can advantageously be used to elevate the catalyst particles.

In cracking operations as above described, wherein catalyst particles move through a cracking zone and are then elevated for another pass through the cracking zone, catalyst attrition is a serious problem. This attrition occurs in the cracking zone, in the regeneration zone, and especially during gas lift operations by the grinding action of the catalyst particles against each other and against the confining surfaces of the apparatus. Catalyst attrition in some instances may be so severe as to render a cracking process uneconomical.

An object of the present invention is to provide a cracking catalyst resistant toward attrition. A specific object is to provide a process for preparing a siliceous cracking catalyst which is highly resistant toward attrition. A further object is to provide a process for the preparation of novel siliceous cracking catalysts especially effective for cracking hydrocarbons, and to the cracking of hydrocarbons with the novel catalyst.

By "siliceous cracking catalyst," as used herein, is meant a catalyst containing a major proportion of silica and which is known to exhibit activity toward cracking hydrocarbons. Synthetic catalysts such as silica-alumina, silica-magnesia, silica-zirconia, silica-alumina-magnesia and silica-vanadia catalysts, the preparation of which is well known, can be used in the present process with good results. Natural clays which may be acid activated such as fuller's earth, kaoline, the montmorillonite group including bentonite, and the like can also be used in the process of the invention. Particles of such siliceous catalyst, which may be in the form of pellets or granules of a size suitable for use in a moving bed or fluidized bed hydrocarbon cracking process, are used in the present invention.

It has now been found that by heating particles of a siliceous cracking catalyst with a compound of a group II metal and aluminum phosphate, a boron compound and/or a group I metal compound, as hereinafter described, a discontinuous glassy coating is formed on the exterior surface of the catalyst and the resulting particles strongly resist attrition.

In accordance with the invention, a compound of a metal of group II of the periodic table admixed with aluminum phosphate and/or a boron compound and/or a compound of a metal of group I of the periodic table is heated in contact with a siliceous cracking catalyst. Group II metal compounds which can be used include the carbonates, oxides, hydroxides, phosphates and acetates of the group II metals. Magnesium oxide, magnesium carbonate, magnesium phosphate, barium carbonate, calcium oxide and calcium carbonate illustrate preferred group II metal compounds which give good results in the invention. Boron oxide, boric acid and borax illustrate preferred boron compounds which can be used. Sodium carbonate, potassium carbonate, sodium oxide and potassium oxide illustrate preferred group I metal compounds which can be used. The admixtures of metal compounds including a group II metal compound, used in accordance with the invention, are preferably employed in comminuted form so that the particle size is no greater than 100 mesh (U.S. sieve series). An intimate physical admixture of particles of a group II metal compound with aluminum phosphate and/or a boron compound and/or a group I metal compound illustrates the operable materials in accordance with the invention. The mixture to be heated with the siliceous catalyst should contain from about 40% to 95%, and preferably from 60% to 90%, of the group II metal compound. The remainder of the mixture is composed of aluminum phosphate, a boron compound or a group I metal compound, or any mixture thereof in any proportion. In the absence of aluminum phosphate, the quantity of boron compound and/or group I metal compound used is preferably maintained at a low value within the stated range, from about 5% to 10%, of either or both components, giving good results. If two or more group II metal compounds are used, the total should be within the stated range of from 40% to 95%. Calcium carbonate is a preferred group II metal compound and boric acid is a preferred material to use therewith, and hence for convenience the invention is hereinafter largely described using these compounds as illustrative of those which are operable.

In order to prepare the catalyst particles of the invention, a minor proportion of a comminuted mixture of calcium carbonate and boric acid is heated in contact with particles such as pellets of a siliceous cracking catalyst to a temperature sufficient to cause an interaction or fusion between the calcium carbonate boric acid and components of the cracking catalyst so that glazed areas are formed on portions of the exterior surface of the cracking catalyst pellets. The glaze is a glass or glass-like film apparently formed by the interaction or fusion. Formation of the glaze is substantially on the exterior surface of the catalyst pellet. The quantity of calcium carbonate and boric acid used must be such that only a discontinuous glaze is obtained on the pellets so that catalytic activity is not lost. From about 10% to 60%, and preferably from about 20% to 50%, of the total exterior surface area of the pellets is coated with the glassy film. Advantageously the catalyst preparation is performed continuously while operating a process for cracking hydrocarbons. In this embodiment of the invention, a comminuted mixture of calcium carbonate and boric acid is advantageously introduced into the cracking process as a slurry in the hydrocarbon feed. The addition may be continuous or intermittent. Only a small amount of the added mixture, from about 0.2 to 1 pound per ton of catalyst per day, is used. While the mechanism of the formation of the glassy discontinuous surface is not known with certainty, it is believed to be formed in the catalyst regeneration step wherein relatively high temperatures are obtained on localized areas of the catalyst particles during the burning of carbon therefrom. It is known, however, that by introducing a mixture of calcium carbonate and boric acid with the hydrocarbon feed and carrying out the cracking cycle, after cracking and subjecting the catalyst particles to regeneration including the burning of carbon therefrom, the regenerated catalyst particles exhibit a glaze on a portion of the surface thereof. It is also known that this glaze substantially reduces attrition of the catalyst particles without decreasing the catalytic activity thereof.

In another embodiment of the invention, the catalyst particles having a glassy discontinuous surface are prepared prior to use in a cracking operation. This is accomplished by admixing catalyst pellets with minor quantities of a comminuted calcium carbonate-boric acid mixture and heating the resulting admixture, preferably with agitation, to a temperature sufficient to form the glaze, usually a temperature of from about 500° C. to 870° C. or higher. When relatively high temperatures are employed, it is preferred to operate so that the entire catalyst is not heated to such a high temperature. For example, dropping a pellet partially coated with the mixture through a suitable furnace can be used with good results. The resulting catalyst particles containing the discontinuous glassy surface are then used in cracking processes.

As above described, the catalysts of the invention are especially effective for cracking hydrocarbons wherein catalyst attrition is normally observed, as in moving bed and fluidized bed operations. Cracking conditions heretofore described are used such as temperatures of about about 400° C. to 550° C. and pressures of from atmospheric to 50 p.s.i. (pounds per square inch).

In accordance with the present invention, the loss of catalyst such as to catalyst fines is reduced at least 20% and such loss may be reduced by 50% or more. It is a further characteristic of the process of the invention that cracking activity of the catalyst is not appreciably decreased by the discontinuous glassy surface formed in accordance with the invention. Apparently by coating less than 50% of the catalyst particles, sufficient surface area remains so that a reduction in catalytic activity is not observed.

The following examples illustrate embodiments of the invention in which "parts" refers to parts by weight. In the examples, pellets of a synthetic silica-alumina cracking catalyst containing about 87% silica and 13% alumina and having an activity index of about 46 were contacted with the indicated mixture of comminuted metal compounds, the quantity of the metal compounds used being sufficient to contact only portions of the surface of the catalyst pellet. "Activity index," as used herein, is a measure of the efficacy of a catalyst for cracking hydrocarbons and is determined by a method described by Alexander, Proceedings Am. Pet. Inst. 27 (III), 51 (November 1947). The mixture was then rapidly heated to a temperature sufficient to cause interaction, which was above about 900° C., for from about 1 to 2 minutes. The metal compound mixtures used and results obtained are given below.

*Example 1*

A comminuted mixture containing about equal parts of calcium carbonate, magnesium oxide and boric acid was admixed with pellets of the synthetic silica-alumina cracking catalyst as above described. After heating, the pellets exhibited glassy areas over a portion of the exterior surface thereof, less than about 50% of the surface area being covered with the glaze.

When used in a catalytic cracking process for converting hydrocarbons boiling in the range of from about 200° C. to 450° C. to gasoline hydrocarbons, the cracking activity as compared to the cracking catalyst without treatment as above described is substantially identical. However, loss to catalyst fines due to attrition is decreased about 30%.

*Example 2*

The procedure of Example 1 was repeated using aluminum phosphate as the sole metal compound. No glassy areas were observed on the surface of the cracking catalyst.

*Example 3*

The procedure of Example 1 was repeated using a mixture of aluminum phosphate and calcium carbonate, the quantity of calcium carbonate being about ½ of the amount of aluminum phosphate. Although some glazed areas on the surface of the catalyst particles were observed, all of the metal compounds did not appear fused. Hence the quantity of calcium carbonate used should be at least equal to the amount of aluminum phosphate and/or the group I metal compound.

*Example 4*

Particles of the synthetic silica-alumina cracking catalyst were admixed with a mixture of 42½ parts of calcium oxide, 15 parts of magnesium oxide and 42½ parts of aluminum phosphate. Good results were obtained substantially as described in Example 1.

*Example 5*

Example 4 was repeated except that barium carbonate was used instead of magnesium oxide and the quantity thereof was increased to about 30 parts. Good results were obtained substantially as described in Example 1.

The foregoing examples illustrate embodiments of the invention. When a group I metal compound such as sodium oxide or potassium oxide is substituted for the boric acid or the aluminum phosphate of the foregoing examples, substantially equivalent results are obtained.

The invention claimed is:

1. Process for the preparation of a cracking catalyst resistant to attrition which comprises heating discrete granular solid particles of a siliceous cracking catalyst with a minor proportion of discrete granular solid material comprising a glaze-forming group II metal compound and aluminum phosphate to a temperature sufficient for the formation of a discontinuous glaze on from about 10% to 60% of the exterior surface of the siliceous catalyst particles.

2. Process according to claim 1 wherein said siliceous cracking catalyst is a silica-alumina catalyst.

3. Process according to claim 1 wherein said siliceous cracking catalyst is a silica-magnesia catalyst.

4. Process according to claim 1 wherein said siliceous cracking catalyst is a silica-zirconia catalyst.

5. Process according to claim 1 wherein said siliceous cracking catalyst is a silica-alumina-magnesia catalyst.

6. Process according to claim 1 wherein said siliceous cracking catalyst is a clay.

7. A new catalyst effective for cracking hydrocarbons which comprises particles of a siliceous cracking catalyst having a discontinuous glaze on from about 10% to 60% of the exterior surface thereof, said glaze having been formed by heating particles of the siliceous cracking catalyst with a group II metal compound and aluminum phosphate.

8. In a process for cracking hydrocarbons wherein hydrocarbons boiling above the gasoline range are contacted with a siliceous cracking catalyst under cracking conditions, thereby to convert at least a portion of said hydrocarbons to hydrocarbons boiling in the gasoline range, and thereafter regenerating said catalyst by burning carbonaceous deposits therefrom and reusing the regenerated catalyst in the cracking step, the improvement which comprises introducing with the hydrocarbon feed material from about 0.1 to 1 pound of a mixture of a glaze-forming group II metal compound and aluminum phosphate per ton of catalyst per day, thereby to form a discontinuous glaze on from about 10% to 60% of the exterior surface of the catalyst particles.

9. Process according to claim 1, wherein said temperature is in the range from 500° C. to 870° C.

References Cited in the file of this patent

UNITED STATES PATENTS

| | | |
|---|---|---|
| 2,340,698 | Ruthruff | Feb. 1, 1944 |
| 2,407,918 | Burgin | Sept. 17, 1946 |
| 2,469,512 | Naugle | May 10, 1949 |
| 2,685,569 | Nicholson et al. | Aug. 3, 1954 |
| 2,779,742 | Emmett | Jan. 29, 1957 |